June 9, 1942.     E. A. THOMPSON     2,285,760
CHANGE SPEED GEARING WITH AUTOMATIC OVERDRIVE
Filed March 6, 1933     6 Sheets-Sheet 1

Inventor
Earl A. Thompson
By Blackmore, Spencer & Flint
Attorneys

June 9, 1942.　　　E. A. THOMPSON　　　2,285,760
CHANGE SPEED GEARING WITH AUTOMATIC OVERDRIVE
Filed March 6, 1933　　　6 Sheets-Sheet 5

Inventor
Earl A. Thompson
By Blackmore, Spencer & Fluck
Attorneys

June 9, 1942.  E. A. THOMPSON  2,285,760
CHANGE SPEED GEARING WITH AUTOMATIC OVERDRIVE
Filed March 6, 1933  6 Sheets-Sheet 6

Inventor
Earl A. Thompson
By Blackmore, Spencer & Flint
Attorneys

Patented June 9, 1942

2,285,760

UNITED STATES PATENT OFFICE 2,285,760

CHANGE SPEED GEARING WITH AUTOMATIC OVERDRIVE

Earl A. Thompson, Birmingham, Mich., assignor to General Motors Corporation, Detroit, Mich., a corporation of Delaware Application March 6, 1933, Serial No. 659,752

80 Claims. (Cl. 74—472)

This invention relates to the transmission of power and more particularly to certain improvements in change speed mechanisms.

A specific embodiment of the invention, to be hereinafter described specifically in connection with a drive for motor vehicles, involves a manually controlled unit with any suitable number of speed settings with which is associated an automatically controlled unit, active in any speed setting of the manual unit to vary power delivery in accordance with the operating or driving conditions. With this arrangement, the use of a two speed automatic unit doubles the number of speeds afforded by the manually controlled unit. If the manually controlled unit has, for example, two forward speeds, such as "low" which involves reduction gearing and "high" in which the drive is direct, and the automatic unit provides for direct drive and overspeed drive, the combinations to be afforded include low-direct, low-overspeed, high-direct and high overspeed, and but a single manual shift is needed between the four speed settings.

To provide structure of the character described which will function satisfactorily in the manner indicated, is the primary object of the invention. Another object is to provide a dependable control for the automatic unit. The control preferably is such that the drive through the automatic unit comes into action whenever a predetermined relation exists between the engine throttle position and the rotational speed of the output shaft of the automatic unit.

A further object is the particular arrangement of power or drive transmitting elements with respect to each other whereby a minimum of power loss is had, and a maximum of efficiency in transfer of energy from prime mover to final drive is achieved.

It is likewise an object of the present invention to provide an automatic control system for a variable speed transmission in which speed ratio selection is achieved by a speed governor working jointly with a connection from the vehicle engine throttle control so that the actual prevailing speed ratio of drive represents both the driver's will and the driving conditions which the power of the engine must meet.

Additional objects and features of advantage will become apparent during the course of the following specification when taken in connection with the accompanying drawings, wherein.

Figure 1:
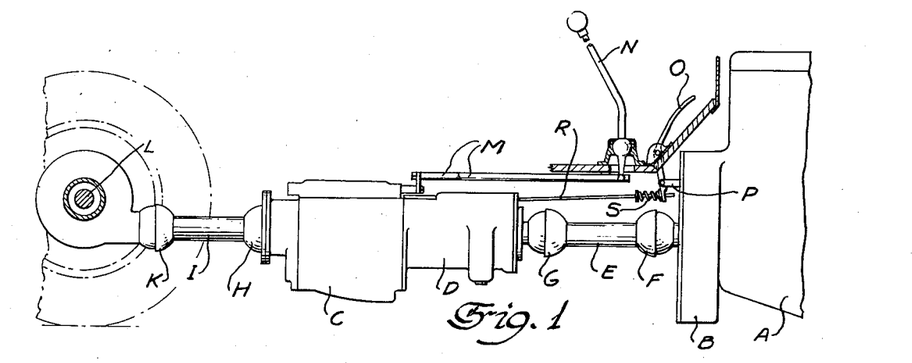
Figure 1 is a fragmentary side elevation showing more or less diagrammatically an arrangement of the power transmission mechanism and its relation to the power plant and driving axle.

Referring to Figure 1 of the drawings, the letter A indicates a power plant which in the case of a motor vehicle usually consists of an internal combustion engine having a clutch B by which the engine crankshaft is coupled to the running gear. For some installations it is proposed to mount the change speed mechanism amidships of the vehicle or approximately half way between the engine and the driving axle. The change speed gearing includes the manually controlled unit C and the automatically controlled unit D, the automatic unit being located on the engine side of the manually controlled unit and connected with the clutch mechanism by a suitable drive shaft E, which by preference is connected with the clutch and change speed gearing by universal joints F and G. The output shaft of the transmission may be connected through a universal joint H to a propeller shaft I, in turn connected through a universal joint K to the driven mechanism, which includes an axle L. The manually controlled unit C may be actuated through suitable shifter rods M, which extend forwardly for engagement by a hand lever N at the driver's seat. Also located adjacent the driver's position is a foot pedal or accelerator O extending through the floor boards and being connected by a link P with the carburetor throttle or other device for controlling engine operation. The accelerator pedal O is also connected with a link R, preferably through a lost motion connection, which includes a coil spring S, through which thrust is transmitted from the lever O to the rod R, whereby the position of the throttle valve plays a part in the ratio selection action of the automatic unit D, as will be more fully described later. Attention is directed to the fact that in placing the automatic unit between the engine and the manual unit, the invention herewith avoids the necessity for interlocking controls between the units, to compel low gear and positive drive in reverse.

Figure 2:
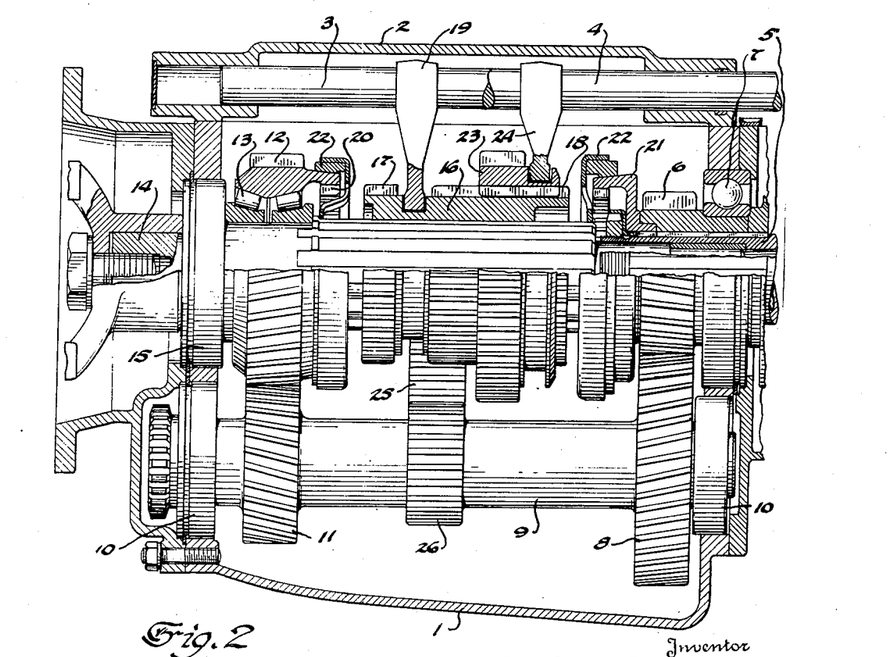
Figure 2 is a vertical sectional view of the manually controlled transmission unit.

Referring now to the detailed construction of the manually controlled power transmitting unit C as shown in Figure 2, the numeral 1 indicates a gear box or housing having a cover 2 removably secured over the top thereof and providing bearings for a pair of shifter rods 3 and 4, respectively which as before indicated are movable through the actuation of the gear shift lever to bring about the proper engagement of certain gears to control the speed ratio of the input and output shafts. The input shaft is here indicated by the numeral 5 and has keyed or otherwise fitted thereto the helical gear 6, the hub of which is mounted for rotation in a suitable ball or other anti-friction bearing 7, carried by the wall of the housing 1. The gear 6 meshes with a mating gear 8 on the counter-shaft 9, which is mounted at opposite ends in the housing through suitable bearings 10—10. At the end of the counter-shaft 9 opposite that which carries the gear 8, there is shown a helical gear 11 in constant mesh with a gear 12, which is mounted in tapered bearings 13 for rotation on the output shaft 14. This shaft 14 has a bearing 15 in the wall of the housing and is piloted at its forward end in a pocket of the input shaft 5. Splined on the output shaft is a sliding sleeve 16 having on its periphery two sets of clutch teeth 17 and 18, respectively. Intermediate the sets of clutch teeth, the sleeve 16 is provided with an annular groove in which is seated a fork 19, mounted on the shifter rod 3 for moving the sleeve 16 back and forth. Movement of the sleeve to the extreme left brings the teeth 17 into engagement with internal teeth 20 formed in an extension of the helical gear 12, while movement to the extreme right brings the teeth 18 into mesh with internal teeth 21 of a clutch element 21a which is keyed at its hub on the driving shaft 5. To bring about smooth tooth engagement, synchronizing clutch devices 22, of a well known type, can be associated with each of the groups of teeth 20 and 21. Carried by the slider 16 in interlocking engagement with the clutch teeth 18 is a slider gear 23, adapted to be actuated by a fork 24 mounted on the shifter rod 4, into and out of engagement with an idler gear 25 which meshes with a gear 26 of the counter-shaft 9.

The several parts as shown in this figure are in their neutral or non-driving relation. To obtain the transmission of power through this mechanism, the shifter mechanism must be actuated to bring certain of the gears into engagement. For example, when low gear drive is desired, the clutch teeth 17 and 20 are engaged, in which case the rotation of the input shaft 5 drives the reduction gearing 6—8 and 11—12, the drive being transmitted through the clutch teeth 20 and 17 to the slider sleeve 16, which is keyed to the output shaft 14 and, therefore, rotates the same at a speed slower than that of the input shaft 5. To obtain direct drive, the clutch teeth 18 are meshed with the clutch teeth 21, and since the clutch teeth 21 are keyed to the input shaft, the two shafts will rotate at the same speed. For reverse drive the sliding gear 23 is engaged with the idler gear 25 and the drive is from the shaft 5 through the constant mesh gears 6 and 8 and the gears 26 and 25 to the gear 23, keyed to the slider 16, whereby the direction of rotation of the output shaft is reversed.

Figure 3:
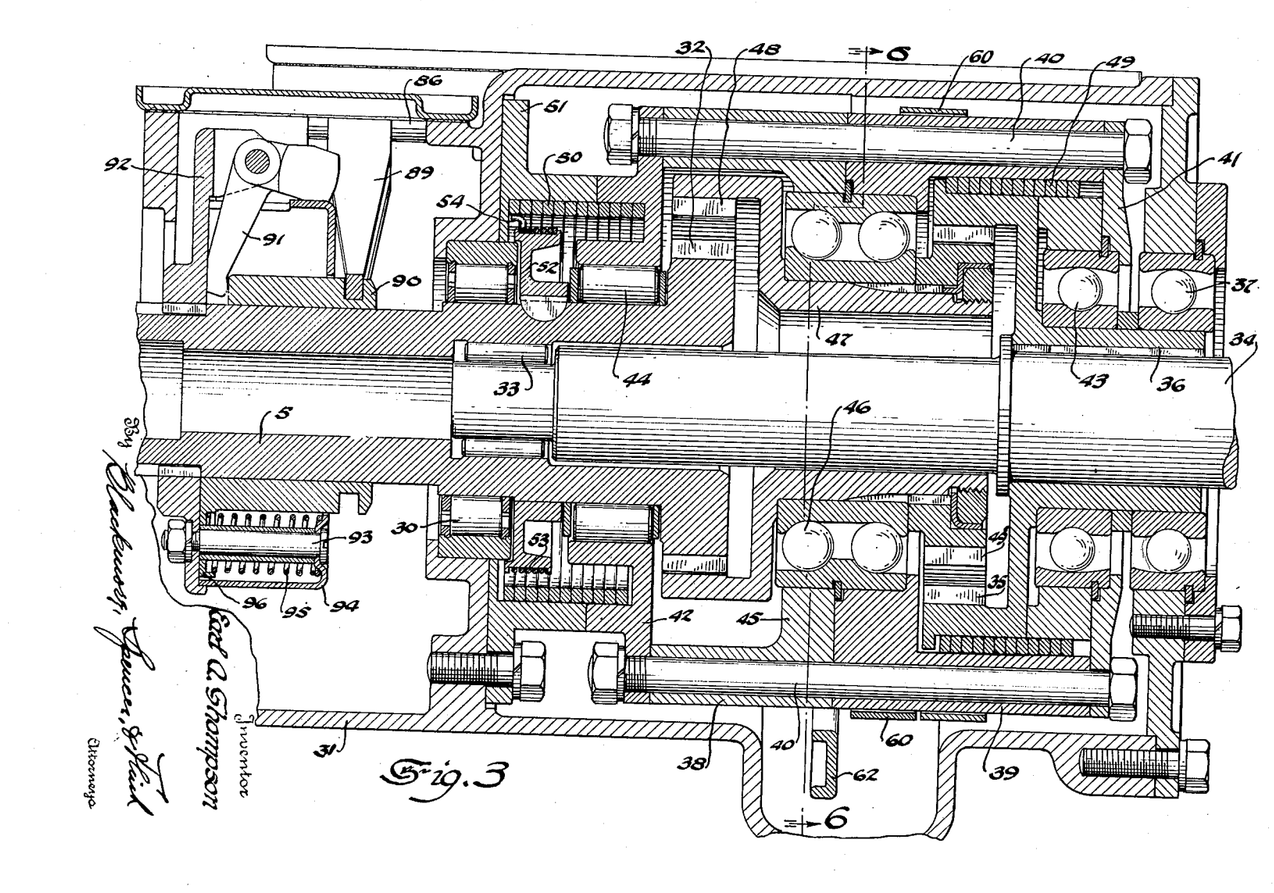
Figure 3 is a vertical sectional view of the automatically controlled transmission unit.

In those cases where the manual and automatic units are joined, as illustrated by Figure 1, the input shaft 5, in Figure 2, may extend into and become the output shaft of the automatic unit, as shown in Figure 3. This output shaft 5, in Figure 3, is supported in roller bearings 30 in one wall of the housing 31, and is provided at its forward end with an external gear 32. Within a pocket in the shaft 5 is piloted in roller bearings 33, one end of the input shaft 34. This shaft has keyed or otherwise fixed thereto an internal gear 35, the hub 36 of which is mounted in ball bearings 37 in the end wall of the housing 31. Enclosed within the housing 31 is an inner or movable housing which for convenience of manufacture and assembly may comprise a pair of rings or drums 38 and 39 secured together by a series of long bolts 40, which also secure thereto the end flanges 41 and 42, respectively. The end flange 41 of the inner housing is mounted upon the gear hub 36 through a ball bearing 43, while the flange 42 is mounted upon the shaft 5 through a roller bearing 44 for rotation in the bearings 43 and 44 about the axis of rotation of the shafts 34 and 5. Intermediate the opposite ends of the inner housing, the rings 38 and 39 are provided with an inward extending annular wall 45 in which is provided a circular opening in offset relation to the axis of rotation of said housing and which receives a double roll ball bearing 46 for eccentrically mounting, for independent rotation about the offset axis, a tubular sleeve 47, which carries at one end an internal gear 48 for engagement with the gear 32 and at the other end an external gear 49' for engagement with the gear 35.

Referring to the parts of the automatic unit thus far described and assuming that the shaft 34 is to be driven in a clockwise direction as viewed from the right, the gear 35 engaging with the gear 49' tends to rotate the driver or sleeve 47 in a clockwise direction, but at a speed higher than the speed of rotation of the shaft 34, which movement will be transmitted through the gears 48 and 32 to rotate the shaft 5 also in a clockwise direction and at a speed greater than that of the driver 47. This is true because of the overspeed relationship of the driving elements involved in the demonstration of the example herewith. Because of the offset mounting of the driver sleeve 47 the thrust of the gears will be transmitted through the bearing 46 and cause a clockwise rotation of the inner housing, which is concentrically mounted with reference to the driving and driven shafts. Because of the step-up gearing the speed of the inner housing will be greater than that of the input shaft 34, and the gear 35 fixed thereto, particularly if the resistance offered by shaft 5 to rotation is great. To prevent the inner housing from overrunning or rotating forward faster than the shaft 34 with a consequent diversion of all the power into merely sp'nning the housing idly, use is made of a clutch device, in the present example, in the form of an expanding coil spring 49 interposed between the inner housing and the gear 35, which comes into action whenever the speed of the inner housing tends to exceed that of the gear 35 and lock these two parts together so that the inner housing assembly, the gears, and the two shafts will rotate as a unit and give direct drive between the input and output shafts. This coil spring clutch is a well-known form, and provides one-way drive.

Drive through the gearing is obtained whenever the inner housing is held stationary with reference to the outer housing 31. This may be accomplished by suitable braking mechanisms manually or automatically applied as will be more fully described hereinafter, and whenever the brake comes into action, the transmission of power will be through the gears 35—49' and 48—32 with the sleeve 47 rotating in the eccentrically positioned bearings 46.

In the event the vehicle tends to coast in gear under its own momentum, the shaft 5 then becomes the input or driving shaft to the automatic unit and because of the gearing and the resistance of the engine, there will be a tendency for the inner housing to rotate in a counter-clockwise direction. For this reason the spring brake 50 is interposed between the inner housing and a ring or bracket 51 fixed to the housing 31, and is provided with an outturned end (not shown) to fit a notch or stop on the housing for rotation therewith so as to come into action to prevent counter-clockwise rotation of the inner housing and positively lock it against movement. With the inner housing so locked the coasting force is transmitted through the driver 47 to the engine at reduced speed.

Figure 7:
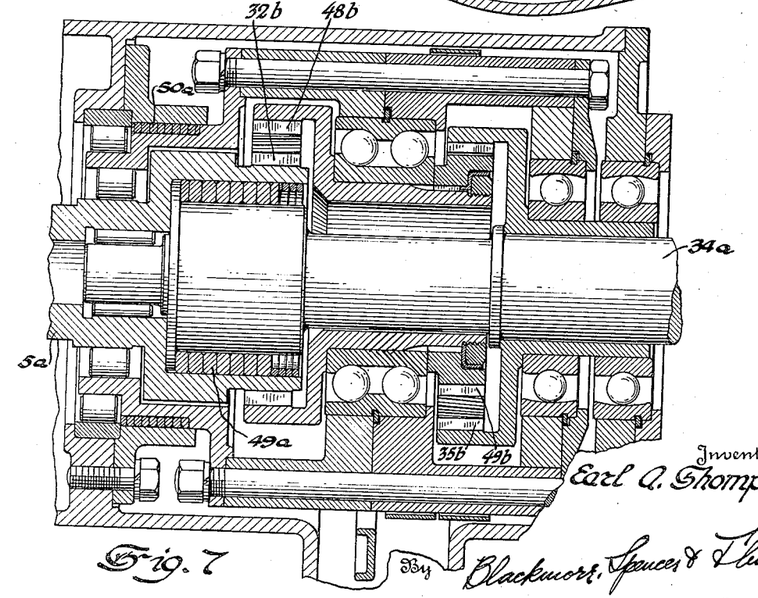
Figure 7 is a vertical sectional view of an alternative construction of the automatic unit.

The parts and their operation is much the same in connection with the alternative form of automatic unit illustrated in Figure 7. In Figure 7 there is shown a spring clutch 49A directly interposed between the shafts 34A and 5A, which is so arranged as to lock the two shafts together for direct drive whenever the engine connected input shaft tends to rotate at a speed faster than that of the output shaft connected to drive the vehicle load. Overdrive or overspeed ratio is effected in the present example through the gearing in the manner previously described, whenever the inner housing is held against rotation. A spring brake 50A interposed between the inner housing and a fixed part of the outer housing is also utilized for preventing unrestricted locking the inner housing against counter-clockwise rotation for coasting through the overdrive gearing. This expedient is a safety measure to guard against excessive gear speeds and to assist the driver in keeping the vehicle under control during high speed operation.

In place of the spur gearing shown in Figure 3, the preferred embodiment employs helical gears as illustrated at 35b—49b and 48b—32b in Figure 7. The common practice with helical gearing is to make all gears of the same hand so as to neutralize the axial thrusts of the gears. In this case, however, use of helical gears of the same hand introduces an unbalanced couple due to the fact that the thrust of one pair of gears against the drive sleeve 47 is on one side of the drive sleeve centerline while the oppositely directed thrust of the other pair is on the opposite side of the center. For this reason the forward pair of gears should be of opposite hand to the rearward pair.

Figure 12:
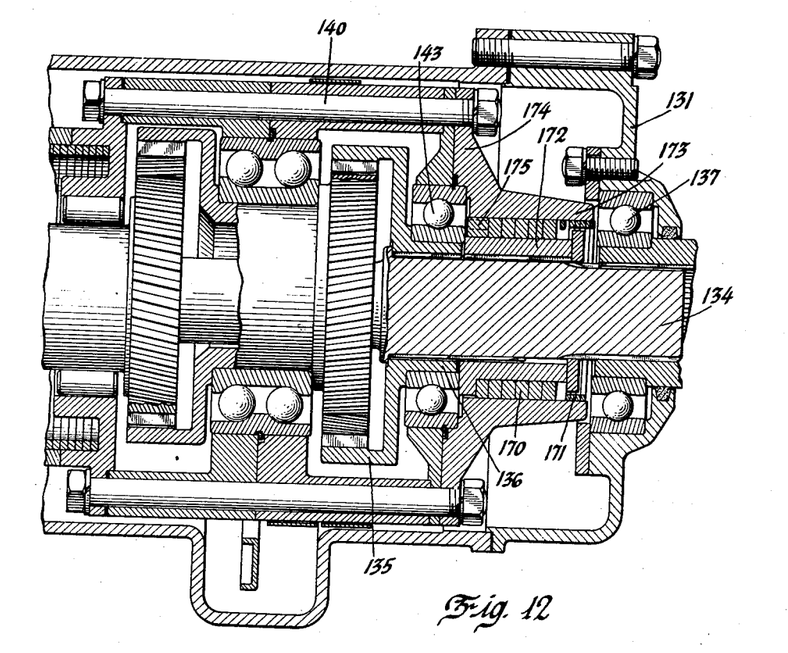
Figure 12 is a longitudinal sectional view of the automatic unit with slight modification.

The helical gearing is also shown in Figure 12, which illustrates another form of automatic unit. Here the coil clutch 170 is considerably smaller in diameter than the corresponding clutch previously described whereby centrifugal force is less effective to draw the coil outwardly and create frictional resistance to coasting. In this case, the spring coil 170 with an auxiliary or teaser spring 171 surrounds a sleeve 172 splined directly upon the input shaft section 134 between the shaft bearing 137 in the end wall of the outer housing 131 and the bearing 143 for the rotatable inner housing on the hub 136 of the internal gear 135 also splined on the input shaft. The clutch is pocketed between the sleeve and the interior surface of a cylindrical or tubular member 173 having an annular flange 174 secured to the inner housing by the assembly bolts 140 for rotation therewith.

Figure 13:
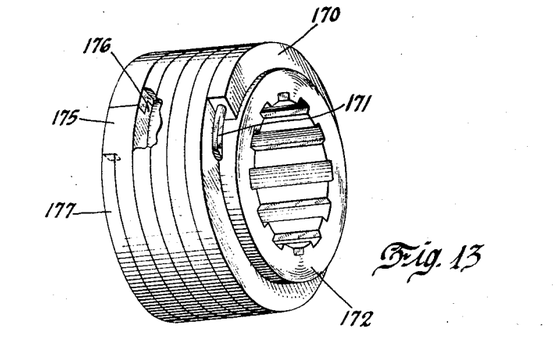
Figure 13 is a detail perspective view of the spring clutch of Figure 12.

To overcome trouble commonly experienced with the anchored end of the conventional wire spring clutch pulling loose during free wheeling it is proposed to form the spring from bar stock and as shown particularly in Figure 13 provide a lateral lug or enlargement 175 at the end to be anchored together with a tab or circumferentially extending tongue 176 for interlocking engagement with mating seats on the driving member. Such seats may be formed on the driving member or sleeve 172 by providing an annular end flange 177, one side of which follows the helical path of the spring coil, and removing material from the flange at the start of the helix to provide spaced abutment surfaces closely fitting the driving lug 175 and undercutting the broader end or abutment of the severed flange to receive and overhang the tab 176. By this construction the spring is locked against uncoiling and the end is held against any lifting tendency.

Referring again to the structure shown in Figure 3 there is shown keyed to the shaft 5 a wheel 52 which carries in a peripheral groove a spring clutch 53, the free end of which may be connected as at 54 with the free end of the coil brake 50. The spring 53 is so arranged as to free wheel whenever the shaft 5 moves in a clockwise direction, but it winds up upon a counter-clockwise rotation of the shaft and tends to unwind the spring 50 to preclude the same acting as a "no back" to prevent the vehicle coasting in the direction opposite to the direction of drive afforded by the manually controlled gear set mechanism. It is believed useful to observe that in providing automatic speed ratio controls, the inventor appears obligated to devise proper safety measures against loss of operator control, of which the expedient described above is an example.

Attention is directed to the fact that with the drive system as described in connection with Figure 3 the operator is normally required to open and close the vehicle main clutch B, for setting up the proper neutral dwell intervals for change of gear in the manual unit. Should the main clutch be open, while the gear change is being made with the vehicle on a reverse gradient, a backward momentum might be quickly developed, for which the coupling means within the automatically controlled unit would be powerless to yield engine braking. Quick closure of the main clutch, to provide engine braking would be of no avail since, by tracing the relative rotations of transmission elements in the automatic unit, one will find that the backward rotation of load connected shaft 5 will induce a retrograde rotation of the carrier under which the reaction clutch cannot grab to couple the load shaft inertia to the engine.

Brake 50 of Figure 3 is interposed between the rotatable housing 42 and the fixed housing 51 so that when the inertia of the vehicle becomes the driving force, the rotatable housing 42 and carrier 45 are prevented from retrograde rotation. The auxiliary spring clutch 53 is arranged to be inactive while shaft 5 has normal forward rotation, but when a reverse rotation is applied to shaft 5, clutch 53 is energised, and being connected to the free end of coil brake 50, causes the latter to be de-energised so that a locking couple will not be set up between gear 32 fixed to shaft 5 and the carrier 45.

The mechanism by which the inner housing is held against rotation to effect overdrive may consist of a brake band 60 adapted to encircle and embrace the peripheral surface of the drum or inner housing. One end of the band may be anchored conveniently by an adjustable stud 61 to the wall of the housing 31, while the other end can be fastened to a lever arm 62 pivotally mounted upon the pin 63' so that the band will be tightened and engaged with the braking surface of the drum upon swinging movement of the lever 62, it being understood that the intermediate part of the band encircles the drum one or more times.

For actuating the lever 62 use may be made of a dash pot arrangement, including a piston cylinder 64, having a piston plunger 63 slidable therein, with a lost motion connection to the lever 62 through a piston rod 66 secured to a slidable disc 67 to which motion of the piston plunger 63 is transmitted by means of a coil spring 68 interposed between the parts. The upper end of the piston cylinder 64 is connected by a port or passageway 69 with a valve chamber, in which is slidable a piston valve 70, having a reduced neck portion 71 (see Figure 5) to afford communication in one or the other positions of the valve between the port 69 and the ports 72 and 73, respectively. Port 72 may be connected by suitable piping with the engine crankcase or sump, while the port 73 may be similarly connected with the engine oil pump mounted in the crankcase. When the piston chamber is brought into communication with the source of oil pressure, the pressure forces the piston downwardly to actuate the brake band member and so hold it applied as long as the source of pressure is not cut off. On the other hand, communication between the piston chamber and crankcase relieves the oil pressure acting in cylinder 64 on piston 63 and allows the latter to be restored by spring 68 and thereby release the brake member.

Figure 5:
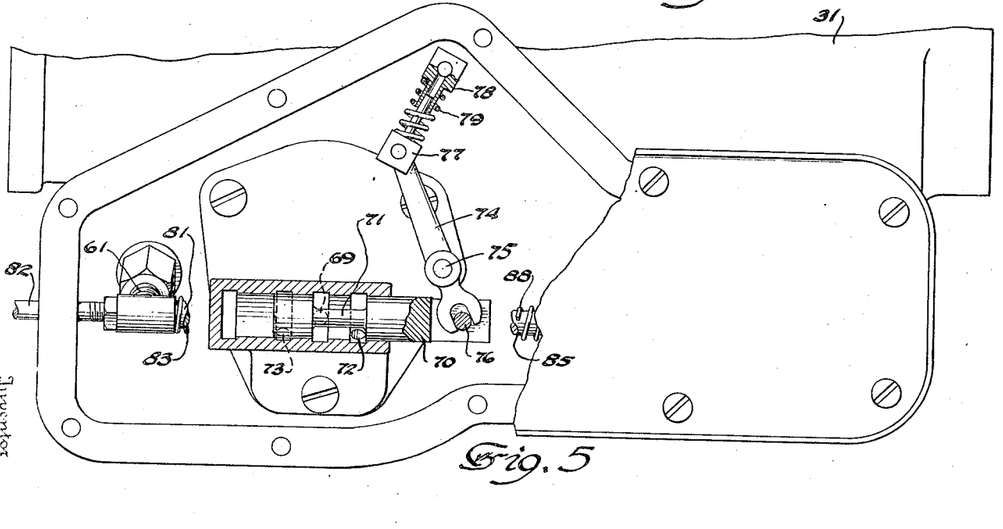
Figure 5 is a top plan view, partly broken away and showing in section the parts illustrated in Figure 4.
Figure 6:
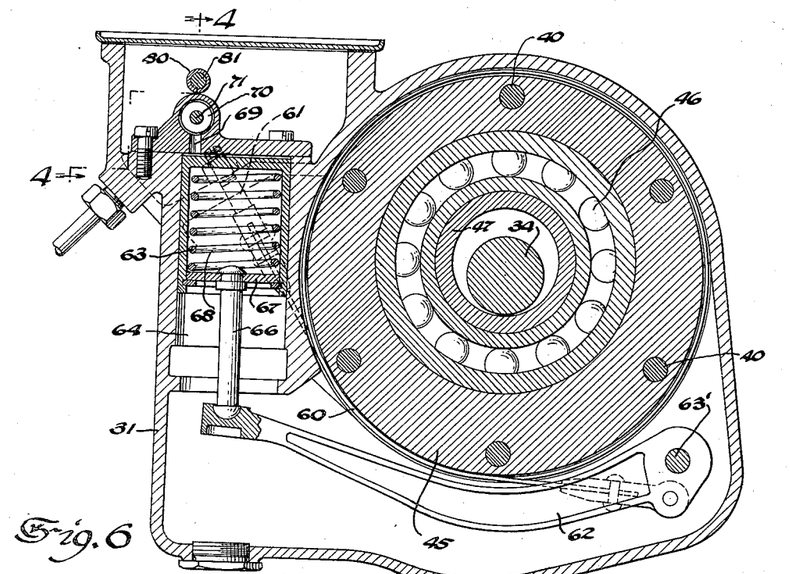
Figure 6 is a transverse section of the automatic unit and is taken on line 6—6 of Figure 3.

To maintain the valve in either one of two positions a snapover spring arrangement may be provided in the form of toggle mechanism as shown in Figure 5, where the lever 74 pivoted at 75 has a forked end that engages a pin 76 in the valve 70, while its opposite end carries a pivoted head 77, which cooperates with a corresponding head 78 on a fixed pivot, with a compression spring 79 between the heads 77 and 78 to resist swinging movement of the lever 74 toward dead center in either direction.

Figure 4:
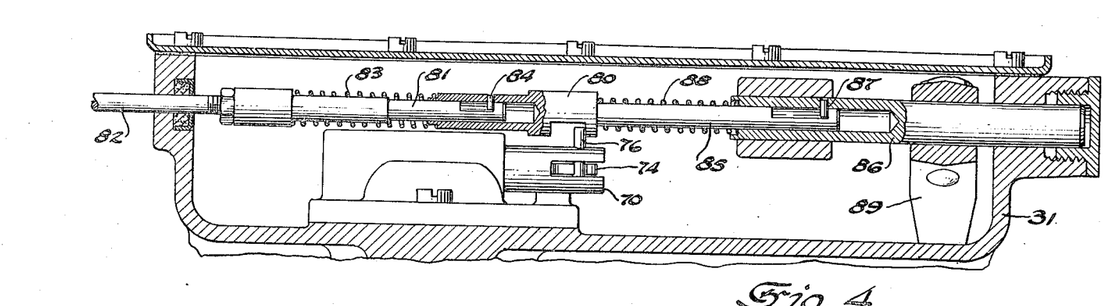
Figure 4 is a detailed sectional view of a portion of the automatic control mechanism and is taken on line 4—4 of Figure 6.

According to the illustrated embodiment, the operation of the valve is dependent upon the relation existing between the position of the carburetor throttle as determined by the setting of pedal O of Figure 1, and the speed of rotation of the output shaft of the automatic unit, as determined by a speed responsive governor to be described further. The operating linkage between the parts includes a floating equalized 80 as shown in Figure 4 having an elongated slot providing spaced shoulders for engagement with the pin 76 carried by the valve plunger 70. One end of the floating equalizer is provided with a socket to telescopically receive a pin 81 fastened on a rod 82 which may be connected to or form a part of the rod R, shown in Figure 1 as being associated with the foot pedal O. Motion is transmitted between the parts through an elastic element or coil spring 83, the parts being held against separation by a pin 84 carried by the member 80 and extending into an elongated slot in the pin 81 to provide the necessary lost motion. From the opposite end of the member 80 is a projecting rod 85 telescopically received within a socket of an actuator bar 86 with lost motion therebetween provided by the pin 87 extending through a slot in the projection 85. A spring or other resilient element 88 interposed between the members 80 and 86 transmits the thrust from one to the other.

Carried by the sliding actuator bar 86 is a forked element 89 which as shown in Figure 3 engages with a slider sleeve 90 on the shaft 5. This sleeve 90 is engaged by one or more governor weights or weighted bell cranks 91 pivotally mounted on a disc or plate 92 carried by the shaft 5. A series of bolts or studs 93 anchor to the plate 92 a stamped metal cup 94 which encloses a series of spring devices 95 bearing at opposite ends against the housing 94 and an annular flange 96 forming a part of the sleeve 90. The springs 95 offer resistance to the sliding movement of the sleeve 90 against the force exerted by the bell cranks 91 as the weighted ends are thrown out by centrifugal force when the speed of rotation of the shaft 5 reaches a predetermined value.

This movement of the shifter sleeve 90 slides the fork 89 and actuator bar 86 to the left as viewed in Figure 4 and transmits its thrust through the spring 88 to the actuating member 80. Movement of the member 80 toward the left shifts the valve 70 to communicate the ports 73 and 69, to connect the pump pressure to the servo cylinder, while the movement toward the right brings about communication of the ports 69 and 72 to connect the servo cylinder to the sump and to shut off the pump pressure. It will be seen that by calibrating the springs 83 and 88 for a given regime of governor force and throttle pedal position a cycle actuation of the valve may be obtained in accordance with a given torque demand relation existing between throttle position and a given speed of the output shaft of the automatic unit, in accordance with the force characteristic of the speed responsive governor. The proper calibration of the force values of springs 83 and 88 enables the driver of the vehicle to initiate a downshift from the higher to the lower gear ratio of the automatic unit, over a given speed range of the governor 91, and within the force limits of lost motion spring S of Figure 1 described preceding, so that under circumstances requiring a higher net driving torque, the operator by depression of pedal O of Figure 1, causes a shift down, giving the engine torque a higher mechanical advantage over the load to be driven. This action is made positive by the toggle mechanism 74 to 79 of Figure 5, tending to hold valve 70 in one of two operation positions.

When the vehicle is being driven by the engine in direct drive through the automatic unit, and the rotation of the shaft 5 is at a speed insufficient to throw out the weighted bell cranks, the actuation of the engine throttle valve toward open position will move the rod 82 toward the right, in Figure 4, to compress the spring 83 which moves the balancing member 80 against the spring 88 equalizing the forces of the two springs. Because of the lost motion provided by the slot in the equalizer 80, which receives the pin 76, the valve 70 shown in the drawings in its relief setting is maintained in its extreme position by the toggle linkage 74—79. To shift the valve to its other extreme position, which will allow oil under pressure to reach the piston chamber 64 and effect overspeed drive through the transmission, the spring 88 must be further compressed by a movement toward the left, in Figure 4, of the rod 86 and fork 89 with an outward movement of the weighted levers 91 under centrifugal force, as the predetermined rotational speed is reached by the shaft 5. Movement of the member 80 to balance the springs will after taking up any slack between it and pin 76 engage the pin and carry along the valve 70 shifting the relation of the toggle to thereafter hold the valve at its other limit of movement. Provision of the lost motion between the pin 76 and the balancing member allows limited balancing movement without disturbing the valve setting. It should be understood that in determining the relative force coaction between springs 83 and 88, induced by rods 81 and 85, it is desirable that the operator be given the power to control the automatic unit by accelerator pedal movement, over a governor speed range which is established with respect to the available power of the engine and to the load of the vehicle. As described above, the throttle advancing motion of the accelerator pedal O, through the coordinating mechanism of Figures 4 and 5, causes the ratio of the transmission unit to shift down, and it is conversely true that within a given range of governor speed, the inverse action of shift to the higher ratio occurs when the pedal is moved to retard the throttle. As the speed of the shaft 5 falls below the point where centrifugal force on the bell cranks is overcome by the spring 95, the balancing of the springs 83—88 then reverses the valve setting to relieve pressure in the dash pot and restore direct drive through the transmission mechanism. It will be understood that with the advanced accelerator settings, rod 82 will be moved to deliver a maximum force to spring 83 in accordance with high torque demand, and therefore tend to maintain the valve 70 in the direct drive, or lower speed ratio position.

It may be important for best results to locate the automatic unit forward of the input side of the manual shift mechanism so that its operation may remain unchanged regardless of the speed setting of the manually controlled unit or whether one of the forward speeds or the reverse speed is selected. Obviously, too, the speed responsive device may be associated with the output side of the automatic unit either between the automatic unit and the manual unit or beyond the manual unit.

Figures 8, 9:
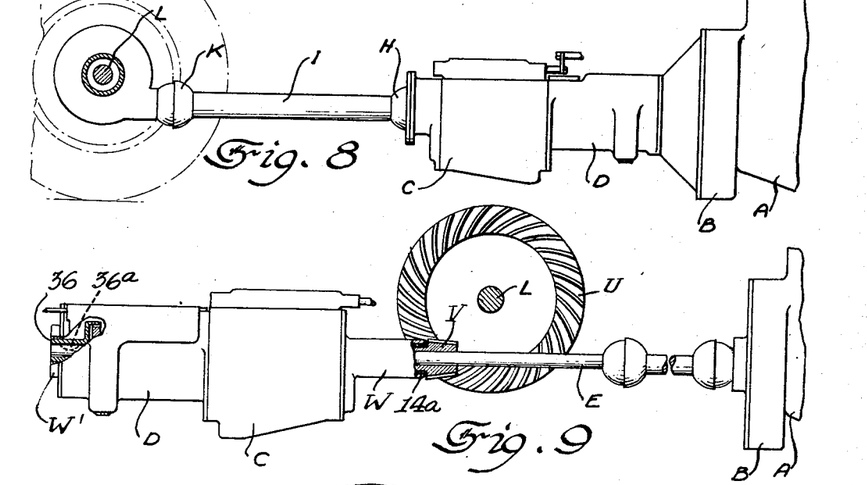
Figures 8, 9, 10 and 11 schematically illustrate various useful combinations and locations of the operating mechanisms.
Figure 10:
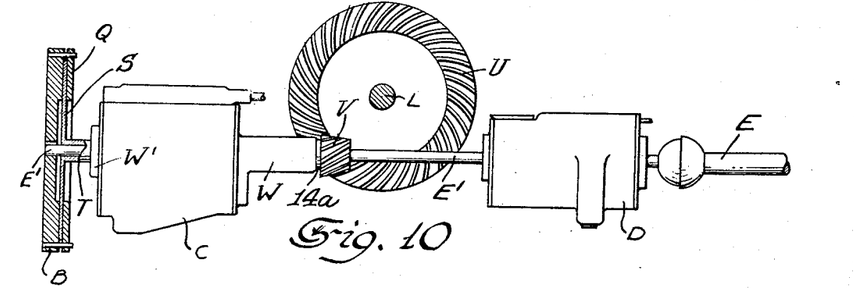
Figure 11:
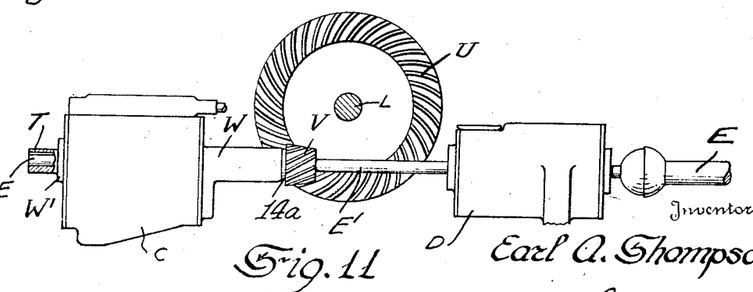

While it is preferable for certain classes of vehicles to mount the transmission assembly amidships, as illustrated in Figure 1, this relation of parts may be varied to suit conditions of use and different types of vehicles. For example, in some cases the transmission mechanism may be mounted directly on the engine and form an integral part of the power plant as illustrated in Figure 8, where A is the engine, B the clutch, D the automatic unit, C the manual unit and I a propeller shaft connected at opposite ends by universal joints H and K, respectively, with the transmission and driving axle L. In Figure 9 the automatic unit D and manual unit C are located to one side of the axle L, while the engine A and clutch B are located on the opposite side. The left end of shaft E is indicated in Fig. 9 by reference character 34, joined to gear sleeve 36 by key 36a. The pinion V which drives ring gear U is affixed to sleeve 14a by key or equivalent attachment means. The extension of casing C which supports the pinion and shaft assembly is indicated at W, whereas the extension W' at the left end of the drawing supports gear sleeve 36. In this case the drive shaft E from the engine extends entirely through the transmission assemblies in nested relation to the transmission output shaft which is geared to the driving axle L. An arrangement of this sort may be advantageously used with a vehicle in which the engine is mounted rearward of the driving axle as well as with the conventional practice of mounting the engine at the front end of the vehicle. In Figure 10 is illustrated an arrangement wherein the clutch B is interposed seriatim between the manual unit C and the automatic unit D, the automatic unit being directly connected with the source of power. The solid shaft between the transmission is shown at E'. The pinion V is attached to sleeve or collar 14a, and drives ring gear U—Extension W of casing C supports the pinion and shaft assembly as in Figure 9—W' is the extension of the casing C which supports the shaft assembly at the left. In this case the output shaft of the unit D extends through the manual shift unit C in nested engagement with the output shaft of the clutch assembly. In the construction of Figure 11, the automatic unit D and manual unit C are placed on opposite sides of the driving axle L with the automatic unit connected with the power plant and having its output shaft extending through the manual unit and engaging with the input shaft in nested relation. As in Fig. 10, solid shaft E' connects the two transmission units, and is joined directly to hollow shaft T at the left, where extension W' supports the assembly, and sleeve 14a is joined to pinion V which drives ring gear U.

In Figures 9, 10 and 11 the primary power shaft in each case, which delivers input power to the transmission units located to the left of the centerline of element L, passes through a hollow shaft or sleeve indicated by 14a in Fig. 9. Assuming normal clockwise rotation for the engine, it will be apparent that the arrangement permits advantageous reduction in relative speeds at points of bearing support between the shaft and sleeve, in the described transmission arrangement which supplies normal clockwise rotation of the sleeve in forward driving. This is of particular applicability in the commercial utility of my device wherein separate units are required for weight distribution of power plant and power drive mechanisms, as will be apparent from inspection of the above mentioned figures.

I claim:

1. In combination with a source of power and an element to be driven, of power transmitting means including a manually controlled speed change unit, an automatically controlled speed change unit associated with the input side of the manual unit, a connecting shaft joined to both units and control means for the automatic unit which includes a connection to the power source speed control and a speed responsive device operative at the speed of said shaft to control the speed ratio of said automatic unit.

2. In combination, a source of power, operator-operative means continuously effective to control the power output of said source, change speed power transmitting mechanism including alternate clutch-brake actuation associated with said means and provided with a control element, and a speed responsive device assocaited with the output side of said power transmitting mechanism and continuously cooperatively related to the power source control means for continuously varying the action of said control element.

3. Change speed mechanism including coaxially arranged input and output shafts, a carrier rotatable about an axis coincident with that of said shafts, means operative to lock the carrier against rotation, a drive transmitting member operatively engaged with said shafts to transmit the drive therebetween and eccentrically mounted in said carrier to rotate the same when the locking means is inoperative, and a self actuating clutch device adapted to drive the several relatively rotatable parts as a unit.

4. Change speed mechanism including coaxially arranged input and output shafts, a carrier rotatable about an axis coincident with that of said shafts, means operative to lock the carrier against rotation, a driver operatively engaged with said shafts to transmit the drive therebetween and eccentrically mounted in said carrier to rotate the same when the locking means is inoperative, and an overrunning clutch between said carrier and the input shaft to lock the carrier assembly for rotation as a unit with said shaft.

5. Change speed mechanism including coaxially arranged input and output shafts, a carrier rotatable about an axis coincident with that of said shafts, means operative to lock the carrier against rotation, a driver operatively engaged with said shafts to transmit the drive therebetween and eccentrically mounted in said carrier to rotate the same when the locking means is inoperative, and an overrunning clutch between the two shafts.

6. Change speed mechanism including coaxially arranged input and output shafts, a carrier rotatable about an axis coincident with that of said shafts, means operative to lock the carrier against rotation, a driver operatively engaged with said shafts to transmit the drive therebetween and eccentrically mounted in said carrier to rotate the same when the locking means is inoperative, and means for preventing reverse rotation of the carrier.

7. Change speed mechanism including coaxially arranged input and output shafts, a carrier rotatable about an axis coincident with that of said shafts, means operative to lock the carrier against rotation, a driver operatively engaged with said shafts to transmit the drive therebetween and eccentrically mounted in said carrier to rotate the same when the locking means is inoperative, and a one-way clutch associated with the carrier permitting free rotation in one direction and resisting reverse rotation.

8. Change speed mechanism including coaxially arranged input and output shafts, a carrier rotatable about an axis coincident with that of said shafts, means operative to lock the carrier against rotation, a driver operatively engaged with said shafts to transmit the drive therebetween and eccentrically mounted in said carrier to rotate the same when the locking means is inoperative, and two one-way clutches associated with the carrier, one of which locks the carrier for rotation with the shafts as a unit and the other of which locks the carrier against rotation in the opposite direction.

9. Change speed mechanism, including input and output shafts, an overspeed driving device connecting said shafts embodying means to drive in direct and through gearing and including a rotatable carrier mounting said device in offset relation and receiving the driving thrust, clutch means resisting rotation of the carrier in a direction opposite to the normal driving direction of rotation of one of the shafts, and an auxiliary clutch device operatively associated with and adapted to render the first named clutch means inoperative upon reverse rotation of said shaft.

10. Change speed mechanism, including input and output shafts, an overspeed driving device connecting said shafts, a rotatable carrier mounting said device in offset relation and receiving the driving thrust, means operatively associated with the carrier to resist its rotation, a pressure responsive device for actuating said means, a source of pressure and a valve controlling communication between said pressure source and pressure responsive device.

11. The combination with coaxially arranged input and output shafts, of power transmission mechanism between said shafts, including a rotatable carrier mounted in concentric relation to said shafts and an overspeed driver engaging said shafts and having a bearing in the carrier in offset relation to the axis of carrier rotation, whereby the driving thrust tends to rotate said carrier at a speed greater than that of the input shaft, means to prevent overrunning of the carrier relative to the input shaft and so afford direct drive between the input and output shafts, and means to resist rotation of the carrier under driving thrust so as to transmit power between the shafts through the overspeed driver.

12. The combination with driving and driven members, the driving member having means for controlling the operation thereof, of change speed power transmission mechanism interposed between said members, and provided with a speed responsive device on the output side thereof, and means to change the speed of power transmission through said mechanism in accordance with the relation between the power output of the driving member and the resistance offered by the driven member, including a resilient element adapted to transmit an operating force to said means upon the actuation of said operation controlling means of the driving member and a resilient thrust transmitting member associated with said speed responsive device and adapted to act in opposition to the first mentioned resilient member.

13. In a variable speed power transmission mechanism between a driven member and a driving member, means to automatically change the speed setting of said mechanism in accordance with the relation between power delivered by the driving member and resistance offered by the driven member, including a movable control device for said mechanism, a pair of thrust transmitting springs acting in opposition to each other to actuate said device whenever the force of one overcomes the resistance of the other, a speed responsive device associated with the output side of the mechanism and adapted to stress one of said springs and a control device for said driving member adapted upon operation to stress the other spring.

14. In combination, an engine, a variable speed power transmission mechanism coupling input and output shafts, a speed ratio selector device associated with said mechanism for establishing the selected ratios of drive between said shafts, pressure responsive actuating means for actuating said device, a fluid pressure supply device driven constantly by rotation of said engine, a governor responsive to the speed of one of said shafts, and means moved automatically by said governor for connecting said pressure supply device with said fluid pressure responsive actuating means when a predetermined relation exists between engine power input and power output of said transmission.

15. In combination, an engine having a pressure lubricating system including an oil pump and an oil sump, a load shaft, a selective speed power transmission mechanism coupling said engine with said load shaft, a fluid pressure responsive device adapted to actuate said mechanism for establishing selected speed ratio drive thereof, a speed responsive governor deriving constant rotation from said engine, and a two-position valve controlled by said governor adapted to communicate said device with the pump in one speed-controlled position and with the sump in the other speed controlled position thereof.

16. In combination, an engine having a pressure lubricating system including an oil pump and an oil sump, a selective speed power transmission mechanism operatively connected with the engine having an input and an output shaft, a pressure responsive device for controlling the speed selection provided by said mechanism, a valve adapted to communicate said device with either the sump or the pump, and means to automatically control said valve in accordance with the operating conditions, including a speed responsive device driven by the output shaft of the transmission, thrust transmitting elements associated with said speed responsive device and the engine throttle respectively, a valve actuator mounted for limited relative movement between said elements, and elastic means forming part of each thrust transmitting elements and acting in opposition to shift said actuator with the overbalance of one elastic force by the other.

17. In combination, an engine provided with means for controlling the operation thereof, change speed mechanism for transmitting power from the engine having input and output shafts, said mechanism having associated therewith a speed selector and a speed responsive device driven from the output shaft of said mechanism, thrust transmitting elements associated with said device and engine control means respectively, and thrust balancing means interposed between said elements to control the speed selector.

18. In combination, an engine having a throttle valve governing fuel feed thereto, change speed mechanism having an input shaft associated with the engine and coupled to an output shaft and arranged to transmit power therebetween and equipped with an output driven speed responsive governor, fluid pressure means controlling the actuation of the speed ratio setting of said mechanism and having an operating valve, and means for automatically actuating said valve, including elastic thrust transmitting elements associated with said throttle and said speed responsive governor respectively, and a floating equalizer device movable under the resultant net of balanced forces of said elastic elements to actuate said valve.

19. In a motor vehicle, in combination, an engine, a throttle for the engine, a driving and a driven shaft, a variable speed step-ratio transmission between the shafts adapted to couple them at a plurality of speed ratios, speed ratio control means for said transmission, a fluid pressure device for actuating said means, a fluid pressure supply for said device, a governor mechanism operating at the speed of one of the shafts adapted to control the output of said supply to said device for selecting the speed ratio of said transmission, and means interconnecting said throttle, governor mechanism, and said fluid pressure device whereby at governor speeds above a predetermined speed, the engine decelerating motion of said throttle causes said fluid pressure device to shift said variable speed transmission to a higher speed ratio.

20. In power transmission, in combination, an engine, a throttle for said engine, an automatically operated variable speed step-ratio transmission driven by the engine, a manually operated variable speed transmission, fluid pressure change speed actuating means for said automatic transmission, an intermediate shaft between said transmissions, a governor on said shaft, and control means for said first named means connected to said governor and to said engine throttle such that under predetermined movement of said throttle the said control means automatically selects speed ratio whenever the governor speed is greater than a predetermined speed.

21. In power transmissions, in combination, a variable speed transmission comprising, an input geared element, an output geared element, an intermediate toothed element meshing with both said input and output geared elements, a carrier for said intermediate toothed element, a helical spring overrunning clutch placed between said input geared element and said carrier and so mounted as to prevent the carrier from rotating faster than said input geared element, and a brake for said carrier.

22. In power transmissions, in combination, a variable speed transmission comprising, an input geared element, an output geared element, an intermediate geared element meshing with both said input and output geared elements, a helical spring overrunning clutch located between said input and output geared elements effective to couple them together when said input geared element tends to rotate faster than said output geared element, a carrier for said intermediate geared element, and a helical spring overrunning clutch for preventing backward rotation of said carrier when said first named clutch is ineffective to transmit drive.

23. In power transmissions, in combination, an input geared element, an output geared element, an intermediate geared element meshing with both of said input and output geared elements, a carrier for said intermediate geared element, a helical spring clutch located between said input geared element and said carrier for coupling them at unit speed, an actuable brake for said carrier, and additional retrograde braking means for said carrier effective to prevent backward rotation thereof when said brake is not actuated.

24. In automatic controls for power transmissions, in combination, an engine throttle control, a variable speed power transmission, a power output shaft connected therewith, a transmission speed ratio changing element, fluid pressure means for actuating said element, a ratio control member for said means adapted to direct the pressure of said means for actuation of said element, mechanism continuously responsive to the speed of said shaft operative to move said control member for selection of actuation by said means of said element, and additional means movable by said throttle control operative to move said ratio control member at will at speeds above a predetermined speed of said mechanism, for compelling actuation of said element by said fluid pressure means for a different ratio of said transmission than would be effected by said governor when said manual means occupies an inactive position.

25. In automatic controls for power transmissions, in combination, a variable speed transmission, input and output power shafts for said transmission, a fluid pressure responsive speed change actuating element, a fluid pressure supply, a control device adapted to direct the pressure of said supply to said element for selected speed ratio actuation of said transmission, speed responsive mechanism continuously operative at the speed of one of said shafts to move said device for selection of speed ratio of drive in said transmission, and additional manual means operative to move said control device at will only at increased speeds above a predetermined speed of said mechanism, for compelling a ratio drive in said transmission other than would be determined by said governor when acting alone.

26. In motor vehicles, in combination, an engine, an engine throttle, an automatic variable speed transmission unit, a control for said unit, a power shaft between said engine and said unit, a manually operable variable speed transmission unit, a control for said manually operable unit, an intermediate shaft between said first named and said second named variable speed transmission units, a governor operating at the speed of one of the shafts, and operator operable means common to said engine throttle, said governor, and the control for said first named automatic variable speed transmission unit such that the latter may be controlled for automatic speed ratio selection over a range of selected speeds of said second named manually operable variable speed unit.

27. In controls for power transmissions, in combination, a variable speed power transmission, input and output shafts for said transmission, control mechanism for selection of speed ratio of said transmission, a preloading device for biasing said mechanism to occupy predetermined positions, a speed responsive governor continuously operative at the speed of one of said shafts to position said control mechanism, and manually operable means effective to position said control mechanism at will only at increased speeds above a predetermined speed of said governor.

28. In controls for automotive vehicles in combination, an engine, an engine throttle, an engine throttle control, a variable speed transmission unit, a power shaft between said engine and said variable speed transmission unit, a load shaft receiving power from said transmission unit, a speed ratio changing control mechanism for said transmission unit such that said load shaft may be driven at the same speed as the power shaft or at a predetermined increased speed to that of the power shaft, and means common to said control mechanism and said engine throttle control such that at load shaft speeds above a predetermined speed, movement of said engine throttle control in opening of said engine throttle is operative at will to shift said speed ratio changing control mechanism.

29. In power transmissions, in combination, a variable speed transmission and a control therefor, engine driven fluid pressure servo means for actuating said variable speed transmission control, for both increasing and decreasing changes in transmission speed ratio, a control mechanism for said servo means, a speed governor operatively connected to said control mechanism for selecting the effective driving ratio of said transmission, and a separate connection manually operable to move said control mechanism at will, within a governor speed range greater than a predetermined minimum governor speed effective to compel servo actuation of said transmission for establishing another speed ratio than that ratio selected by the said governor.

30. In power transmissions, in combination, an engine, an engine throttle control, a variable speed transmission unit, engine-driven fluid pressure servo means constituting a substantially unvarying pressure source, pressure engaged transmission speed ratio actuating mechanism connected to said means, a speed ratio selector for said device, and a connection between said selector and said engine throttle control such that predetermined transmission speed ratio selection is controlled by movement of said throttle control.

31. In power transmissions, in combination, an engine, an engine throttle, a control for moving said throttle for both increasing and decreasing speeds of said engine, a variable speed step-ratio gear transmission driven by said engine and driving a load shaft, said transmission including a clutch adapted to transmit drive from said engine to said load shaft at one forward ratio of said transmission, and including a second path of torque through the gears of said transmission, and control means moved by said throttle control coincidentally operative when said throttle is moved to decrease the speed of said engine to cause disengagement of said clutch while compelling forward drive at a predetermined different drive ratio of said transmission through said gears than that ratio of drive transmitted by said clutch.

32. In power transmissions, in combination, an engine, an engine throttle, a control for said throttle effective to increase and decrease the speed of said engine, a variable speed step-ratio gear transmission driven by said engine and driving a load shaft, said transmission including a clutch adapted to transmit forward drive between said engine and load shaft at one step-ratio, and including a second path of torque through gearing, and control means moved by said throttle control coincidentally operative to cause disengagement of said clutch and to compel drive through said gearing when said throttle control is moved to decrease the speed of said engine and to cause engagement of said clutch and release of drive through said gearing when said throttle control is moved to increase the speed of said engine.

33. In power transmissions, in combination, an input geared element, an output geared element, an intermediate geared element transmittting torque between both said first named elements, a carrier for said intermediate geared element, automatic retrograde braking mechanism for said carrier, and a release device for said mechanism operative through limited angular movement of said output geared element to control movement of said mechanism, said device being operatively connected to said mechanism.

34. In power transmissions, in combination, an input geared element, an output geared element, an intermediate geared element meshing with both said first named elements, and an automatic braking mechanism for said intermediate element releasable by a device responsive to relative angular movement of said output geared element, said device being operatively connected to said braking mechanism for assuring the release thereof.

35. In power transmissions, in combination, an input geared element, an output geared element, an intermediate geared element transmitting torque between both said first named elements, a carrier for said intermediate geared element, automatic retrograde braking mechanism for said carrier, and auxiliary means operatively connected to said mechanism and with said output geared element, said means being operative by relative angular movement of the said output geared element to release the said mechanism in order to permit forward rotation of said carrier.

36. In power transmissions, in combination, an engine, an engine throttle, a variable speed transmission driven by said engine, control mechanism for said transmission interconnected with said throttle, and a speed responsive governor operative to move said control mechanism, and interconnecting means arranged such that said governor is operative at below a predetermined speed to prevent selection of speed ratio by movement of said throttle, and means operative such that said throttle interconnection is continuously operative to vary speed ratio at governor speeds greater than said predetermined speed.

37. In power transmissions, in combination, an engine, a variable speed transmission adapted to be coupled to said engine, a clutch connected to the engine at one end of said transmission and adapted to couple the engine to a power shaft, a power shaft extending through said transmission and coupled by said clutch to said engine, a hollow load shaft surrounding a torque transmitting part of said power shaft and extending from said transmission at one end thereof opposite to the location of said clutch, and a driving differential mechanism operatively connected by gearing to said load shaft at a point where it extends from said transmission.

38. In power transmission mechanism, in combination, an engine, an intermediate power shaft, a variable speed transmission joining said engine to said shaft, a second variable speed transmission connected to said shaft, a driving differential mechanism located between said transmissions, a hollow load shaft geared to said mechanism, and operatively connected to said second variable speed transmission, said load shaft surrounding said intermediate shaft and normally rotating in the same direction as the said intermediate shaft.

39. In power transmission mechanism, a variable speed transmission unit comprising a power shaft entering said unit from one end thereof and extending through said unit, a hollow load shaft surrounding said power shaft and coupled by output gearing to a final drive, variable speed transmission means adapted to couple said shafts for normal rotation in the same direction of rotation and for reverse rotation in the opposite direction, and a clutch for connecting the said power shaft to said load shaft and said means located at the opposite end of said unit to that where the said power shaft enters.

40. In power transmissions for motor vehicles, in combination, a power shaft, a hollow load shaft concentric with the power shaft and surrounding a torque-transmitting portion of said power shaft and normally rotatable in the same direction of rotation as the said power shaft, a first variable speed transmission unit adapted to be coupled to said power shaft, a second variable speed transmission unit concentric to and adapted to couple said first unit with said load shaft whereby normal operation of said units and said shafts are to the same hand of rotation, the said second variable speed transmission unit embodying the said hollow load shaft, such that each of the said shafts and said units are coupled concentrically, and clutching means effective to connect the drive of said units together, located at an end of said second named unit opposite to the point of coupling of said second unit to said load shaft.

41. In power transmissions for motor vehicles, in combination, a transmission casing, a hollow load shaft supported in said casing rotating normally in one direction and coupled by output gearing to a final drive, a power shaft entering said casing from one end thereof and supported for rotation within and by said load shaft and rotating concentrically in the same direction as said first named shaft, a variable speed coupling unit operatively connecting said shafts for relative rotation in the same direction and for reverse rotation in the opposite direction, geared elements so arranged within said coupling unit that the net speed difference between the shafts is always less than the maximum speed of either shaft during forward drive, and a clutch for connecting said shafts and said unit at the opposite end of said unit to that where the power shaft enters said transmission casing.

42. In variable speed gearing of intermeshing groups, in combination, a primary geared element, a secondary geared element, an intermediate geared element independently rotatable therefrom, helical teeth of one hand on said primary geared element, helical teeth of opposite hand on said secondary geared element, helical teeth on said intermediate element meshing with the helical teeth of both of said primary and secondary geared elements, and means effective to absorb the axial component of thrust from the interaction of said helical teeth.

43. In power plant assembly and power drive mechanisms for automotive vehicles, in combination, a power plant, a primary power shaft, a first transmission unit connected to said shaft, a secondary power shaft, a second transmission unit connected to said secondary power shaft, a final drive assembly and a final load shaft geared to said assembly at a point between said transmission units.

44. A power plant and variable speed drive assembly comprising two variable speed transmission units, an intermediate power shaft connecting said units, a final drive assembly located between said units, and a hollow load shaft geared to said assembly and constituting the power output member of one of said units.

45. In power transmission controls, in combination, a power plant, an operator-operative control for said power plant, a variable speed transmission unit driven by said power plant, a shaft driven by said unit, a second variable speed transmission unit driven by said shaft one of said units embodying an alternate clutch-brake ratio changing device, a final drive assembly driven by said second transmission unit, a governor driven by said shaft, means connecting said governor and said operator-operative control effective to jointly select speed ratio of that one of said transmission units embodying said alternate clutch-brake ratio changing device, and additional means operative to select speed ratio of the other transmission unit.

46. In power transmission controls, in combination, a power plant, an operator-operative control for said power plant, a variable speed transmission unit driven by said power plant, a shaft driven by said unit, a second variable speed transmission unit driven by said shaft, a final drive assembly driven by said second transmission unit, an auxiliary power device effective to actuate speed ratio shift of one of said transmission units, a governor driven by said shaft, means connecting said governor and said operator-operative control effective to jointly control the action of said auxiliary power device, and additional means operative to select speed ratio of the other transmission unit.

47. In power transmission controls, in combination, a power plant, an operator-operative control for said power plant, a variable speed transmission unit driven by said power plant, a shaft driven by said unit, a second variable speed transmission unit driven by said shaft, a final drive assembly driven by said second transmission unit, an auxiliary fluid pressure device effective to actuate speed ratio shift of one of said transmission units, a governor driven by said shaft, means connecting said governor and said operator-operative control effective to jointly control the selection and actuation action of said auxiliary fluid pressure device, and additional means operative to select speed ratio of the other transmission unit for establishing a range of overall change speed ratios of drive between said power plant and said final drive assembly.

48. In power transmission controls, in combination, a power plant, an operator-operative control for said power plant, a variable speed transmission unit driven by said power plant, a shaft driven by said unit, a second variable speed transmission unit driven by said shaft, a final drive assembly driven by said second transmission unit, a servo device supplied by operation of said power plant effective to actuate speed ratio shift of at least one of said transmission units, a governor driven by said shaft, speed ratio selection means connecting said governor and said operator-operative control effective to control jointly the action of said servo device, and additional means operative to select speed ratio of the other transmission unit for establishing a range of overall change speed ratios between said power plant and said final drive assembly.

49. In automatic controls for automotive vehicles, an engine, a speed controlling accelerator pedal for said engine, a power input shaft driven by said engine, a power load shaft, a variable speed transmission unit in driving connection with said load shaft, an intermediate power shaft in driving connection with said unit, a speed responsive mechanism driven from one of said shafts, an auxiliary automatically controlled variable speed transmission unit controlled by coacting speed-selecting elements connected to said speed responsive mechanism and to said engine accelerator pedal and connected to said engine in driven relationship through said power input shaft, said intermediate power shaft joining said variable speed transmission units, and operator-operated means separately effective to establish a range of overall speed ratios by said variable speed transmission units at the will of the operator.

50. In automatic controls for automotive vehicles, in combination, a variable speed engine, a speed control pedal for said engine, a variable speed ratio transmission unit driven by said engine connected to a load shaft, shift actuation means for said unit, a speed responsive governor, a speed ratio control mechanism embodying one element connected to said pedal, a second element connected to said governor, a third element connected to said means, said third element having limited movement between end point positions, and a device operative to correlate the positioning of said first named two elements such that said third element may be positively placed and held in one of two said end point positions for alternative selection of speed ratio drive followed by shift actuation by said means.

51. In automatic controls for automotive vehicles, in combination, a variable speed engine, a variable speed ratio transmission embodying hydraulically actuable speed change members, a fluid pressure servo device driven by rotation of an engine connected element, a valve controlling the flow of fluid pressure from said device to said members, a speed responsive governor operatively connected with and applying force to said valve thereby controlling the actuation of said members, and manually operable means effective to oppose the force of said governor acting on said valve and to shift said valve to ratio settings other than determined by said governor.

52. In power transmission devices embodying variable speed gearing, in combination, a plurality of clutch means connected with said gearing, a driven shaft driven by said clutch means and gearing, an actuator for one of said means, a valve controlling the flow of fluid to said actuator, a speed responsive governor operatively connected with and applying force to said valve controlling the actuation of said actuator, and manually operable means effective to oppose force of said governor acting on said valve and to shift said valve to ratio settings other than determined by said governor.

53. An automatic transmission mechanism for a vehicle having an engine, a driving shaft, a driven shaft, a clutch for connecting the shafts in direct drive, means for connecting the shafts at a geared speed ratio when said clutch is released, means for automatically actuating the clutch, an engine accelerator pedal, and means connected to said pedal operable to cause engagement of said clutch or to connect said first named means upon predetermined movement of said pedal.

54. In a transmission mechanism, a driving shaft, a driven shaft, a clutch adapted to connect the shafts for direct drive, a centrifugal device adapted to cause actuation of the clutch, a gear train connecting the shafts around the clutch at a geared speed ratio, controllable coupling means adapted to establish drive through said gear train, actuation means for said coupling means, an engine throttle control, and coacting means connecting said control and said device effective to select direct drive by said clutch or geared drive by said coupling means according to the will of the operator and the driving conditions affecting the action of said centrifugal device.

55. Power transmission apparatus including two rotary members driven by an engine, an engine throttle control, and a change-speed mechanism operatively associated with the members, the change-speed mechanism including two sets of drive devices, each set being operatively interposed between the rotary members, one set of the drive devices including a drive member in radial engagement with an element of one torque path, and the other set of drive devices including means to impart drive through gearing releasable by changes in the driving conditions and jointly by changes in the applied power made operative through a linkage to said throttle control such that the acceleration and deceleration motion of said throttle control causes alternate drive by said devices.

56. In a device of the class described, the combination of a transmission, an engine and an engine throttle, a ratio control valve adapted for shifting movement to place the transmission gears in driving engagement or to establish direct drive when shifted, a speed responsive device, means connected to the speed responsive device effective to move the valve to predetermined positions, and manual means conjointly effective to operate the engine throttle and to effect the movement of said valve between said predetermined positions, said movements overlapping wherein coaction between driver-will and a speed condition of said speed responsive device is effective to determine either direct drive or drive through the gearing of said transmission.

57. In a power transmission control mechanism, in combination, an engine, a throttle, a throttle lever, a variable step-ratio transmission embodying means to drive alternately in direct drive or through gearing, a speed ratio changer for the transmission, an auxiliary fluid pressure device for actuating the change of ratio in the transmission, a control means for said device, a governor and movable means connected to the elements of the said device, throttle lever and governor, wherein the forces of interaction existing among said elements are effective to select either direct drive or drive through said gearing in accordance with the opposing forces applied to said movable means by said lever and said governor.

58. An engine, an operator-controlled engine throttle, a driving shaft, a driven shaft, a variable speed ratio coupling between the shafts including a speed ratio actuating member and means to drive in direct or through gearing, auxiliary power means continuously operative to move said member, a speed ratio selector continuously operative to control said auxiliary power means, and a continuously operable device connected therewith and movable by changes in the speed of one of the said shafts and by variations in the motion of said operator-controlled engine throttle to position said speed ratio selector, cause movement of said auxiliary power means and thereupon establish drive in direct or through said gearing, by corresponding movement of said actuating member.

59. In power transmission devices for motor vehicles, in combination, a variable speed engine, an automatic transmission unit, a manually controlled transmission unit and a load shaft all in coaxial alignment between the power of said engine and the load shaft, automatic change speed controls including a speed responsive governor effective to change speed ratio in said automatic transmission unit, operator-operable controls effective to change speed ratio in said manually controlled unit, means included in the controls for said first named unit effective to establish a no-drive interval, self-synchronizing shift mechanism included in the controls of said second named unit, and operator-operable means embodied in said means such that the operator may release torque in said first named unit and complete a synchronized shift in said second named unit.

60. In power driven vehicles, in combination, a variable speed engine, an operator-operated engine speed control pedal, a change speed transmission gearing unit driven by the engine, a load shaft driven by said gearing unit, a shift actuator mechanism for said unit, auxiliary power means effective to move said mechanism, a control device for said means, a speed responsive governor connected to said device, a coacting interconnection between said pedal and said device, and lost motion means operative between operator movements of said pedal and speed responsive movements of said governor whereby forces originating in said governor and reacting upon said pedal are limited to predetermined amounts.

61. In fluid servo operated change-speed apparatus, in combination, a speed ratio actuating mechanism, a fluid pressure servo motor connected thereto, an auxiliary fluid pressure servo supply device, piping intermediate said motor and said device effective to transmit fluid pressure therebetween, a selector control valve in said piping and a lost motion connection intermediate said motor and said mechanism effective to transmit a varying range of pressures between said motor and said mechanism when said valve is opened, thereby moving said mechanism gradually during the initial stages of actuation of said mechanism.

62. In variable speed power transmission mechanism for motor vehicles having a change-speed mechanism and an engine-throttle actuating device, in combination, a free-wheel clutch having one member secured to the tail or power delivery shaft of the gear box and its other member secured to the driven or power receiving shaft, gear means for bridging the free-wheel clutch to provide an overdrive, and means controlled by the engine-throttle actuating device to render said gear means operative.

63. A change-speed gear for automobiles having an engine and a throttle actuating device, comprising in combination, a gear transmission provided with means for varying its speed ratio and having a tail shaft; and a supplementary transmission having a shaft to be driven from said tail shaft, a free wheel clutch for operatively connecting said shafts to provide a 1:1 ratio between the same, gear mechanism for bridging the free wheel clutch to provide an overdrive ratio, and means controlled by the engine throttle-actuating device to render said overdrive gear mechanism operative or inoperative at will.

64. In a motor vehicle, in combination, an engine, a throttle control for the engine having a normal range of motion between idling and full speed positions, a driving and a driven shaft, a variable speed transmission coupling the shafts, speed ratio actuation means for said transmission movable between limits for increasing or decreasing ratio, a fluid pressure device for actuating said means, a valve operable to control said device for selection of a higher or a lower ratio of said transmission, a centrifugal speed governor operating at the speed of one of the shafts, and mechanism interconnecting said control, said valve and said governor effective to establish one speed ratio of said transmission for a predetermined speed range of said governor and another speed ratio of said transmission for a second speed range of said governor as modified by a predetermined pressure upon said control within its idling and full speed positions.

65. In power transmission controls, in combination, an engine, a throttle control therefor, a variable speed transmission unit driven by said engine, a load shaft coupled to said unit, a speed ratio actuating means for said unit, a fluid servo motor connected to said means, engine-driven fluid pressure means connected to operate said motor, a speed ratio selecting mechanism connected to direct said fluid pressure for actuation of said unit, means within said unit effective to drive said shafts directly or through gearing, and biasing means active between said control and said mechanism operative to establish a higher speed ratio for reduced settings of said control and to establish a lower speed ratio for advanced settings of said control.

66. In controls for power transmissions, in combination, an engine, a throttle pedal therefor, a variable speed step-ratio transmission coupling said engine with a load shaft, a speed ratio control device for said transmission, said device including a speed-responsive governor-connected member; a mechanism comprising a first relatively movable means connected to said throttle pedal effective to transmit a variable force to said device, a second relatively movable means connected to said speed responsive member effective to transmit a variable force to said device, and positively-acting means operative to position said device in one of a number of definite speed ratio determining positions depending upon the relative positioning effects of both of said relatively movable means.

67. In controls for power transmissions, in combination, an engine speed control pedal, a speed ratio selector mechanism linked to said pedal, a variable speed step-ratio transmission coupling an engine shaft with a load shaft, a speed ratio shifter for said transmission, a fluid pressure actuator for said shifter, a valve controlling the action of said actuator, valve-operating means movable by said selector mechanism, a past-center positioning device co-operating with said means effective to establish definite speed ratios of said transmission, and means connected with said device and with said pedal effective and resulting from positioning movements of said pedal to tend to establish corresponding changes in speed ratio inversely to coincidental changes in engine speed established by said movements.

68. In control systems for variable speed power transmissions in combination, a variable speed step-ratio transmission unit providing direct drive and alternate drive through gearing, a ratio shifter actuating and control mechanism for said unit, adapted to establish direct and geared drive, means operative to initiate the action of said mechanism and to cause actuation thereof for selecting and establishing changes in ratio of said transmission including shift to direct drive, an engine throttle pedal movable to select variable engine speeds between limits in accordance with operator-supplied pressure thereupon, position-determining means for said mechanism, and a connection from said pedal to said initiating means effective to transmit thereto a tendency to establish a lower speed ratio in said unit when said pedal is moved to advance the engine throttle and to transmit thereto a tendency to establish a higher speed ratio in said unit when said pedal is moved to retard the engine throttle, the effect of said pedal motion upon said mechanism resulting in the said position-determining means holding the said mechanism positively in a definite ratio position, the transmission ratio selection action of said pedal upon said initiating means and said mechanism being effective over the range of motion of said pedal between its high and low engine speed control limits.

69. In power transmissions, in combination, an engine, an engine throttle, a throttle control pedal, a variable speed transmission unit driven by the engine and driving a load shaft, friction means effective to establish drive at one speed ratio of said unit, clutching means effective to drive at another speed ratio of said unit comprising relatively rotatable driving and driven elements, actuation means for said friction means, control mechanism for said actuation means connected to said pedal, and lost motion connections for transmitting movement between said pedal and said control mechanism for rendering said mechanism effective upon predetermined motion of said pedal in either throttle advancing or retarding direction to establish drive by one of the first-mentioned means while automatically disengaging the other of said means.

70. In power transmissions, in combination, an engine, an engine throttle, a throttle control pedal, a variable speed transmission unit driven by the engine and driving a load shaft, friction means effective to establish drive at one speed ratio of said unit, clutching means effective to drive at another speed ratio of said unit comprising relatively rotatable driving and driven elements, actuation mechanism for said friction means, and connecting means including lost motion connection between said actuation mechanism and said pedal operative upon predetermined throttle advancing movement of said pedal to disconnect drive by one of said means while the other of said means is conditioned to drive because of relative motion of its driving and driven elements, and operative upon predetermined throttle retarding movement of said pedal to cause reconnection of the first of said means with disconnection of the second of said means.

71. In motor vehicle transmission controls, a driving member, a driven member, a variable speed gearing adapted to couple said members including coupling means effective to rotate said driven member at equal speed with the driving member, said coupling means constituting a one-way clutch, and including a reaction sustaining element, a second coupling means adapted to establish overspeed geared drive between said members at a predetermined speed of the said driven member, said second coupling means constituting a brake element effective to lock said reaction sustaining element against rotation during said overspeed drive, fluid actuation means for said second coupling means, a speed responsive means controlling said fluid actuation means, and driver operable means effective to set aside the control of said speed responsive means over said fluid actuation means and cause disconnection of said second coupling means when overspeed drive has been effected, thereby releasing said brake element and causing connection of said one-way clutch.

72. A transmission of the character described, including a drive shaft, a driven shaft, variable speed gearing including primary driving means for connecting said shafts at one speed ratio, secondary driving means adapted to connect said shafts through gearing at a higher speed ratio than that of the primary driving means and coupling means for alternatively connecting the drive of said primary and said secondary means, including a fluid-actuated friction member effective to couple the said shafts for drive by one of said primary or secondary means, and including ratio determining means made operative by relative rotation of the elements to which it is coupled, means for supplying fluid under pressure to actuate said fluid-actuated member, and a governor driven by one of said shafts effective to control the application of said actuating fluid pressure.

73. In vehicle controls, an engine, a throttle pedal for said engine, a driving shaft driven by said engine, a driven shaft, a plurality of driving trains adapted to connect said shafts at direct and at geared ratios, each of said trains including a releasable coupling, at least one of said couplings embodying a friction member engageable and sustained in engagement by fluid pressure for the higher of said ratios of the driving trains, fluid pressure actuating means arranged to engage and sustain said friction member in engagement, a pump driven by one of said shafts for supplying fluid pressure to said actuating means, a centrifugally responsive governor driven by one of said shafts, valving arranged to control the actuation by said fluid pressure actuating means of said friction member, and control means for said valving effective to cause actuation of said friction member or to cause release thereof, said control means being connected for coacting movement by said governor and said throttle pedal such that increased speed of said governor tends to cause actuation of said friction member while increased setting of said throttle connection tends to cause disengagement of said friction member.

74. In vehicle controls, an engine, a throttle therefor operated by a pedal, a driving shaft driven by said engine, a driven shaft, variable speed ratio gearing adapted to couple said shafts through alternately effective driving trains and embodying alternately actuable couplings, one of said couplings including a friction member normally disengaged when drive is established through an alternate driving train, fluid pressure actuable means effective to engage and sustain engaged said friction member while causing disengagement of drive through said alternate driving train, a fluid pressure supply created by rotation of one of said shafts, valving adapted to direct the fluid pressure of said supply to said means for engaging and sustaining said member or to cut off said supply from said means for releasing said friction member, a governor driven from one of said driving or driven shafts, and control means for said valving operated by connections from said throttle pedal and said governor arranged so that under advanced throttle pedal action the friction member tends to be disengaged but under increased governor speeds the friction member tends to be held engaged.

75. In power transmission controls, in combination, an engine, an engine throttle, a throttle control for said engine, a driving shaft rotatable by said engine, a rotatable driven shaft, gearing rotated by said driving shaft for driving said driven shaft, releasable coupling means to permit said driving shaft to rotate said driven shaft at unitary speed or at a ratio of speed thereto through said gearing, said means including a clutch operative upon engagement thereof to connect said shafts together for driving in unison, a fluid-pressure-actuated device for engaging said member, and including a member for establishing drive through said gearing, a fluid pressure supply connected to said device through a controlling valve, a speed responsive mechanism adapted to act at a given speed of one of said shafts to shift said valve to admit fluid pressure to said device for actuating said member, and a connection between said throttle control and said mechanism effective upon advance of said throttle to delay the action of said valve to admit fluid pressure for actuating said member until a given higher speed of said mechanism is attained, said delay occurring in accordance with the degree of advance of said throttle.

76. In power operated vehicles, an engine, an engine throttle, a throttle control, a driving shaft driven by said engine, a driven shaft, variable speed gearing connecting said shafts embodying couplings for connecting the shafts alternately through the gearing or in direct unitary driving ratio, including a clutch for connecting the shafts directly and including a member for establishing alternate geared drive, actuation mechanism effective to engage and sustain said member in engagement, auxiliary power means operative to effect actuation of said member by said mechanism, a centrifugal governor device adapted to control said means for actuation of said member at a given speed above zero speed of said device, and a connection between said control and said device operative to prevent the control of said device from causing actuation of said member at the said given speed when said throttle control is advanced, and inoperative to prevent the said device from causing actuation of said member at a given higher speed of said device.

77. In power operated vehicles, an engine, an engine throttle control, a driving shaft, a driven shaft, variable speed gearing coupling said shafts embodying couplings alternately engageable for establishing direct and geared drive between the said shafts, one of said couplings being a clutch adapted to connect said members for direct drive and the other of said couplings being a friction member normally disengaged, a source of fluid pressure, fluid pressure actuation means arranged to engage said friction member, a governor mechanism driven by the said driven shaft, including an element movable in one direction in accordance with increase of speed of said shaft, a spring adapted to oppose the increasing speed movement of said element, a valve operated by said element at a given increased speed point to admit fluid pressure from said source to said actuation means and thereby engage and sustain said member in engagement, and a connection operative between said throttle control and said element effective at increased throttle positions to increase the governor speed at which the said valve admits fluid pressure to said actuation means, by increasing the loading of said spring.

78. In power controls for motor vehicles, an engine and an engine throttle control, a driving and a driven shaft, a plurality of power transmission trains coupling said shafts, each train including a releasable coupling, said trains being adapted to transmit motion at different speed ratios, said releasable couplings being adapted to transfer the drive for said trains without interruption of torque between said shafts, and at least one of said couplings including a friction member engageable and sustained in engagement by fluid pressure, a fluid pressure actuation means arranged to actuate and sustain the action of said member, speed responsive control means for said fluid pressure actuation means effective to actuate and to release said member from actuation while alternatively causing disengagement and engagement of drive by the coupling of another of the driving trains, and a connection operative between said throttle control and said speed responsive control means effective when moved in one direction to delay the action of said speed responsive control means when said throttle control is moved in one direction, and to permit the said speed responsive control means to cause actuation of said member when said throttle control is moved in the opposite direction.

79. In final drive arrangements for automotive power units, in combination, a primary power shaft located in one plane, a secondary load shaft located in a second plane at right angles to the first plane, a first transmission unit concentric with said power shaft located to one side of the second plane, a second transmission unit concentric with said power shaft located on the opposite side of the second plane, and gearing means intermediate one of said transmission units and said load shaft operative to transmit the variable speed ratios of one or both of said units to said load shaft.

80. In power transmission mounting devices for automobiles in combination, a final output driving member mounted transversely, a power applying system mounted longitudinally, said system comprising, a concentric first transmission unit located on one side of the center of said member, a second balancing concentric transmission unit located on the other side of the center of said member, and gearing means interposed between said member and said system operative to transmit drive in the same direction of rotation of the applied power, the arrangement of units thereby distributing and balancing their weights on opposite sides of said final output driving member.

EARL A. THOMPSON.